(12) United States Patent
Shan et al.

(10) Patent No.: US 10,007,558 B2
(45) Date of Patent: Jun. 26, 2018

(54) METHOD AND APPARATUS FOR ALLOCATING CENTRAL PROCESSING UNIT RESOURCES IN A DEFAULT RESOURCE POOL

(71) Applicant: Huawei Technologies Co., Ltd., Shenzhen, Guangdong (CN)

(72) Inventors: Weihua Shan, Xi'an (CN); Jintao Liu, Xi'an (CN); Houqing Li, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 620 days.

(21) Appl. No.: 14/516,936

(22) Filed: Oct. 17, 2014

(65) Prior Publication Data

US 2015/0040131 A1 Feb. 5, 2015

Related U.S. Application Data

(63) Continuation of application No. PCT/CN2012/080872, filed on Aug. 31, 2012.

(51) Int. Cl.
*G06F 9/50* (2006.01)
*G06F 9/455* (2018.01)
*G06F 9/46* (2006.01)

(52) U.S. Cl.
CPC ........ *G06F 9/5027* (2013.01); *G06F 9/45533* (2013.01); *G06F 9/5077* (2013.01); *G06F 2209/5011* (2013.01)

(58) Field of Classification Search
None
See application file for complete search history.

(56) References Cited

U.S. PATENT DOCUMENTS 9,294,236 B1 * 3/2016 Ward, Jr. ................. H04L 1/20
2008/0028409 A1 1/2008 Cherkasova et al.
2010/0125855 A1 5/2010 Ferwerda et al.
(Continued)

FOREIGN PATENT DOCUMENTS

CN 101488098 A 7/2009
CN 101706743 A 5/2010
(Continued)

OTHER PUBLICATIONS

Daniel Gmach, et al., "Resource pool management: Reactive versus proactive or let's be friends", Computer Networks, vol. 53, No. 17, Dec. 3, 2009, p. 2905-2922.
(Continued)

*Primary Examiner* — Eric C Wai
(74) *Attorney, Agent, or Firm* — Huawei Technologies Co., Ltd.

(57) ABSTRACT

A method for allocating a central processing unit resource to a virtual machine, including determining, according to a change in the number of virtual machines in an advanced resource pool, the number of allocated physical cores in the advanced resource pool; and adjusting, according to the number of the allocated physical cores in the advanced resource pool, the number of allocated physical cores in a default resource pool, where the advanced resource pool and the default resource pool are resource pools that are obtained by dividing physical cores of a central processing unit according to service levels of the resource pools.

16 Claims, 6 Drawing Sheets

(56) References Cited

U.S. PATENT DOCUMENTS

| | | |
|---|---|---|
| 2010/0312893 A1 | 12/2010 | Watanabe et al. |
| 2011/0202925 A1 | 8/2011 | Banerjee et al. |
| 2011/0213886 A1 | 9/2011 | Kelkar et al. |
| 2011/0231853 A1 | 9/2011 | Murray et al. |
| 2012/0096165 A1* | 4/2012 | Madduri ............... G06F 9/5011 709/226 |
| 2013/0160014 A1 | 6/2013 | Watanabe et al. |
| 2013/0179574 A1* | 7/2013 | Calder ................. G06F 9/5033 709/226 |
| 2014/0115586 A1 | 4/2014 | Hong |

FOREIGN PATENT DOCUMENTS

| | | |
|---|---|---|
| CN | 102317917 A | 1/2012 |
| CN | 102508696 A | 6/2012 |
| JP | 2005-234637 | 9/2005 |
| JP | 2009-265778 | 11/2009 |
| JP | 2010-282420 | 12/2010 |
| JP | 2012-058815 | 3/2012 |
| JP | 2013522764 A | 6/2013 |
| JP | 2013541093 A | 11/2013 |
| WO | WO 2011/115750 A1 | 9/2011 |
| WO | WO 2012/032679 A1 | 3/2012 |
| WO | 2012/050772 A1 | 4/2012 |
| WO | WO 2012/050772 A1 | 4/2012 |

OTHER PUBLICATIONS

Daniel Gmach, et al., "Satisfying Service Level Objectives in a Self-Managing Resource Pool", SelAdaptive and Self-Organizing Systems, Sep. 14, 2009, p. 243-253.

Qiang Li, et al., "Adaptive Management of Virtualized Resources in Cloud Computing Using Feedback Control", The 1st International Conference on Information Science and Engineering, Dec. 26, 2009, p. 99-102.

\* cited by examiner

METHOD AND APPARATUS FOR ALLOCATING CENTRAL PROCESSING UNIT RESOURCES IN A DEFAULT RESOURCE POOL

CROSS-REFERENCE TO RELATED APPLICATIONS

This application is a continuation of International Application No. PCT/CN2012/080872, filed on Aug. 31, 2012, which is hereby incorporated by reference in its entirety.

TECHNICAL FIELD

Embodiments of the present invention relate to virtualization technologies, and in particular, to a central processing unit resource allocation method and a computing node.

BACKGROUND

Currently, virtualization technologies are widely applied in the field of information technologies. A virtualization technology provides a capability of deploying a plurality of virtual machines onto one server, which reduces overall costs of a user and improves reliability and flexibility of applications. Currently, CPU overcommitment is universally implemented for management of central processing units (CPUs) of virtual machines in the industry, that is, the number of virtual CPUs of virtual machines is larger than the number of physical CPUs in a server, to fully use physical resources. However, in a case in which physical resources are short, how to allocate physical CPU resources appropriately becomes one of the biggest problems that are encountered. A commonly used implementation manner is to set priorities for the virtual machines, and allocate different quotas of CPU resources to the virtual machines according to different priorities. A higher quota of physical CPU resources is allocated to a virtual machine of a higher priority, to provide different service for users with different requirements and improve quality of service.

Because physical CPU resources are allocated to virtual machines according to priorities, a virtual machine of a higher priority may occupy a dominant position and a virtual machine of a lower priority is unable to obtain a physical CPU resource, which is adverse to effective allocation of the physical CPU resources.

SUMMARY

Embodiments of the present invention propose a central processing unit resource allocation method. It is implemented by separating physical cores of a CPU into different resource pools that, the physical cores are isolated between different resource pools, and the physical cores are allocated dynamically between different resource pools according to the number of virtual machines served by each resource pool, thereby implementing efficient use of the physical core resources and reliably ensuring quality of service of virtual machines in different resource pools.

According to a first aspect, a central processing unit resource allocation method is proposed, where the method includes:

adjusting dynamically, according to a change in the number of virtual machines in an advanced resource pool, the number of allocated physical cores in the advanced resource pool; and adjusting, according to the number of the allocated physical cores in the advanced resource pool, the number of allocated physical cores in a default resource pool, where the advanced resource pool and the default resource pool are resource pools that are obtained by dividing physical cores of a central processing unit according to service levels of the resource pools.

With reference to the first aspect, in a first possible implementation manner, the service level includes the number of physical core computing resources that can be occupied by each virtual machine.

With reference to the first aspect or the first possible implementation manner of the first aspect, in a second possible implementation manner, virtual machines in the default resource pool share computing resources of all the physical cores in the default resource pool.

With reference to the first aspect or the first or second possible implementation manner of the first aspect, in a third possible implementation manner, the advanced resource pool includes a level-1 resource pool, where each virtual machine in the level-1 resource pool is allowed to exclusively occupy one physical core computing resource.

With reference to the first aspect or any one of the first to third possible implementation manners of the first aspect, in a fourth possible implementation manner, the advanced resource pool includes a level-2 resource pool, where each virtual machine in the level-2 resource pool is allowed to occupy 50% of one physical core computing resource.

With reference to the first aspect or any one of the first to fourth possible implementation manners of the first aspect, in a fifth possible implementation manner, the adjusting dynamically, according to a change in the number of virtual machines in an advanced resource pool, the number of allocated physical cores in the advanced resource pool includes:

when the number of the virtual machines in the advanced resource pool increases, determining, according to the number of increased virtual machines and a service level of the advanced resource pool, a first number of physical cores that need to be allocated to the advanced resource pool; and allocating the first number of physical cores to the advanced resource pool from the default resource pool;

or when the number of the virtual machines in the advanced resource pool decreases, determining, according to the number of decreased virtual machines and a service level of the advanced resource pool, a second number of physical cores that need to be subtracted from the advanced resource pool; and allocating the second number of physical cores to the default resource pool from the advanced resource pool.

With reference to the first aspect or any one of the first to fifth possible implementation manners of the first aspect, in a sixth possible implementation manner, the determining, according to the number of decreased virtual machines and a service level of the advanced resource pool when the number of the virtual machines in the advanced resource pool decreases, a second number of physical cores that need to be subtracted from the advanced resource pool, and allocating the second number of physical cores to the default resource pool from the advanced resource pool, specifically includes: allocating the physical cores in the advanced resource pool to the default resource pool when no virtual machine runs in the advanced resource pool.

With reference to the first aspect or any one of the first to sixth possible implementation manners of the first aspect, in a seventh possible implementation manner, before the adjusting dynamically, according to a change in the number of virtual machines in an advanced resource pool, the number of allocated physical cores in the advanced resource pool, the method further includes:

determining that, after the number of the virtual machines in the advanced resource pool changes, the number of the physical cores in the advanced resource pool is insufficient to satisfy the service level of the advanced resource pool.

With reference to the first aspect or any one of the first to sixth possible implementation manners of the first aspect, in an eighth possible implementation manner, before the adjusting dynamically, according to a change in the number of virtual machines in an advanced resource pool, the number of allocated physical cores in the advanced resource pool, the method further includes:

determining that, after the number of the virtual machines in the advanced resource pool changes, at least one idle physical core computing resource that does not serve a virtual machine in the advanced resource pool exists in the advanced resource pool.

With reference to the first aspect or any one of the first to eighth possible implementation manners of the first aspect, in a ninth possible implementation manner, the method further includes: setting, for the virtual machines in the default resource pool, an upper-limit percentage and/or a lower-limit percentage of the physical core computing resources that can be occupied by each virtual machine.

With reference to the first aspect or any one of the first to ninth possible implementation manners of the first aspect, in a tenth possible implementation manner, the method further includes: setting, for the virtual machines in the default resource pool, a priority of each virtual machine in using physical core computing resources, and allocating physical core computing resources to the virtual machines in the default resource pool in descending order of priorities.

According to a second aspect, a computing node applicable to a virtual system is proposed, where the computing node includes:

a resource adjusting unit, configured to adjust dynamically, according to a change in the number of virtual machines in an advanced resource pool, the number of allocated physical cores in the advanced resource pool, and adjust, according to the number of the allocated physical cores in the advanced resource pool, the number of allocated physical cores in a default resource pool; and a resource allocating unit, configured to divide physical cores of a central processing unit into the default resource pool and the advanced resource pool according to service levels of the resource pools.

With reference to the second aspect, in a first possible implementation manner, when the number of the virtual machines in the advanced resource pool increases, the resource adjusting unit determines, according to the number of increased virtual machines and a service level of the advanced resource pool, a first number of physical cores that need to be allocated to the advanced resource pool, and allocates the first number of physical cores to the advanced resource pool from the default resource pool;

or when the number of the virtual machines in the advanced resource pool decreases, the resource adjusting unit determines, according to the number of decreased virtual machines and a service level of the advanced resource pool, a second number of physical cores that need to be subtracted from the advanced resource pool, and allocates the second number of physical cores to the default resource pool from the advanced resource pool.

With reference to the second aspect or the first possible implementation manner of the second aspect, in a second possible implementation manner, the computing node further includes:

a first determining unit, configured to determine that, after the number of the virtual machines in the advanced resource pool changes, the number of the physical cores in the advanced resource pool is insufficient to satisfy the service level of the advanced resource pool.

With reference to the second aspect or the first possible implementation manner of the second aspect, in a third possible implementation manner, the computing node further includes: a first determining unit, configured to determine that, when the number of the virtual machines in the advanced resource pool changes, at least one idle physical core computing resource that does not serve a virtual machine in the advanced resource pool exists in the advanced resource pool.

With reference to the second aspect or any one of the first to third possible implementation manners of the second aspect, in a fourth possible implementation manner, the resource allocating unit is configured to set, for each virtual machine in the default resource pool, an upper-limit percentage and/or a lower-limit percentage of the physical core computing resources that can be occupied by each virtual machine.

With reference to the second aspect or any one of the first to fourth possible implementation manners of the second aspect, in a fifth possible implementation manner, the resource allocating unit is configured to set, for the virtual machines in the default resource pool, a priority of each virtual machine in using physical core computing resources, and allocate physical core computing resources to the virtual machines in the default resource pool in descending order of priorities.

According to the embodiments of the present invention, physical cores are divided into different resource pools, and computing resources of physical cores in one resource pool are isolated from those in another resource pool, thereby implementing effective allocation of physical core computing resources for different application scenarios, avoiding appearance of a dominant virtual machine that occupies plenty of computing resources for a long time, preventing imbalanced allocation of physical core computing resources, and improving efficiency of using computing resources of the physical cores.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

Figure 1:
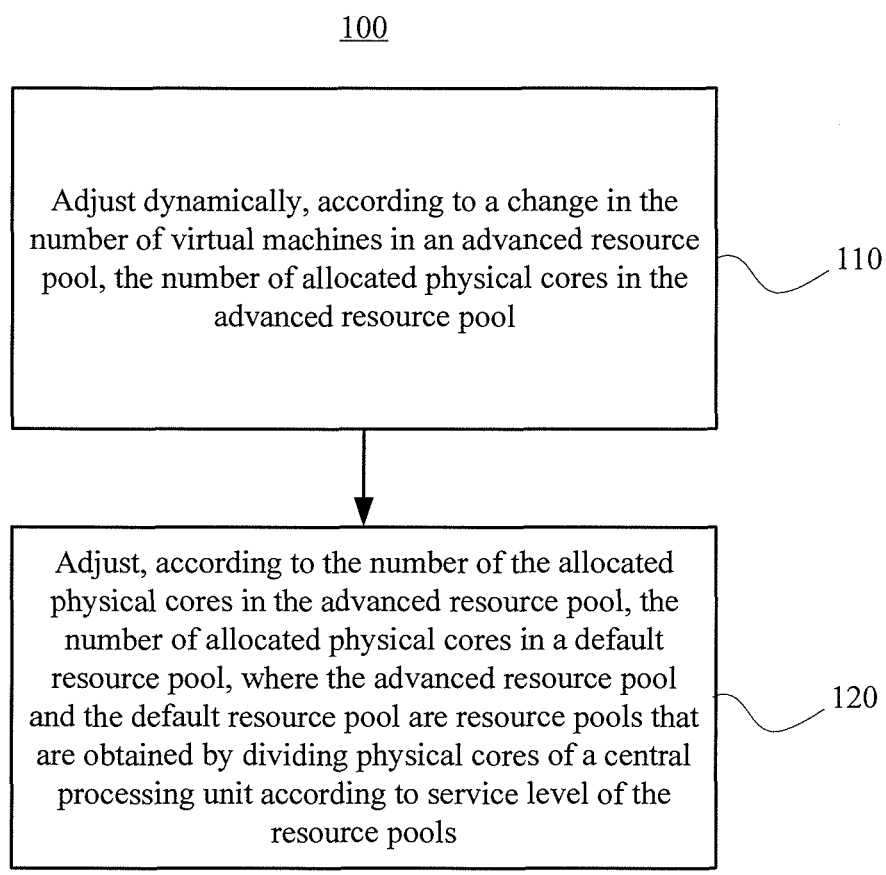
FIG. 1 is a schematic flowchart of a central processing unit resource allocation method according to an embodiment of the present invention.

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

The technical solutions in the embodiments of the present invention are implemented based on a basic capability of binding a virtual CPU (VCPU) of a virtual machine to a specified resource pool. Persons skilled in the art can understand specific manners and implementation methods for binding a VCPU to a resource pool, which, for brevity, are not detailed herein.

In description of the embodiments of the present invention, a physical core refers to a core of a physical central processing unit. A server or a computing node on which a virtual machine runs generally includes a plurality of CPUs, and each CPU includes at least one physical core. The physical cores may be used for different purposes. In the embodiments of the present invention, CPU physical cores that form a resource pool may be physical cores of one CPU or may be physical cores of a plurality of CPUs, where the CPUs may be located on one server or computing node or may be located on a plurality of servers or computing nodes, which is not specifically limited in the embodiments of the present invention.

In the embodiments of the present invention, a virtual machine may include a plurality of VCPUs. For ease of description, an example in which one virtual machine includes one VCPU is described. In the description process, because one virtual machine includes one VCPU in the embodiments, "binding a VCPU and a resource pool" may also be generally expressed by "binding a virtual machine and a resource pool". Persons skilled in the art understand that the meaning of "binding" herein is the same as how the term is usually understood in the art. Persons skilled in the art can understand that "a virtual machine runs in a resource pool" means that the virtual machine occupies a physical core computing resource in the resource pool instead of occupying a physical core computing resource in another resource pool. In the embodiments of the present invention, a physical core computing resource refers to a computing capability provided by the physical core. Computing resources that can be occupied by a virtual machine running in a resource pool may come from one physical core of the resource pool, or may come from a plurality of physical cores in the resource pool, which is not limited in the embodiments of the present invention. The "physical core computing resources that can be occupied by a virtual machine" refer to physical core computing resources in the resource pool in which one virtual machine runs that can be occupied by the virtual machine, or may refer to physical core computing resources in the resource pool in which the virtual machine runs that can be occupied by one VCPU of the virtual machine, or may refer to physical core computing resources in the resource pool in which the virtual machine runs that can be occupied by all VCPUs of the virtual machine. For clarity in the following description, the embodiments of the present invention are described by using an example in which the "physical core computing resources occupied by a virtual machine" are the physical core computing resources in the resource pool in which the virtual machine runs that are occupied by all VCPUs of the virtual machine.

FIG. 1 is a schematic flowchart of a central processing unit resource allocation method according to an embodiment of the present invention. As shown in FIG. 1, the method 100 includes the following steps:

110. Adjust dynamically, according to a change in the number of virtual machines in an advanced resource pool, the number of allocated physical cores in the advanced resource pool.

120. Adjust, according to the number of the allocated physical cores in the advanced resource pool, the number of allocated physical cores in a default resource pool, where the advanced resource pool and the default resource pool are resource pools that are obtained by dividing physical cores of a central processing unit according to service levels of the resource pools.

In the embodiment of the present invention, each resource pool serves virtual machines that run in the resource pool, and a service level of the resource pool corresponds to a service level required by the virtual machines that run in the resource pool. The "service level" here is, for example, the number of physical core computing resources that can be occupied by each virtual machine. In this embodiment and subsequent embodiments of the present invention, "occupy" refers to physical core computing resources that are actually allocated to each virtual machine in the resource pool. For example, in an advanced resource pool, a virtual machine is allowed to occupy 50% of one physical core computing resource, which means that 50% of one physical core computing resource is actually allocated to the virtual machine in the advanced resource pool. For example, in another advanced resource pool, a virtual machine is allowed to occupy one physical core computing resource, which means that one physical core computing resource is actually allocated to one virtual machine.

In the embodiment of the present invention, different resource pools are logically isolated from each other. That is, the physical cores in each resource pool serve only virtual machines that run in the resource pool, and provide physical core computing resources for the virtual machines that run in the resource pool. Logical isolation described here does not exclude a possibility of physical isolation. In a possible implementation manner according to the embodiment of the present invention, different resource pools may even be isolated from each other physically. For example, physical cores in different resource pools are installed on different computing nodes.

In the embodiment of the present invention, virtual machines that run in the default resource pool share computing resources of all the physical cores in the default resource pool. The advanced resource pool may be set according to a specific application requirement. In a possible implementation manner, the advanced resource pool includes a level-1 resource pool, where each virtual machine in the level-1 resource pool is allowed to exclusively occupy one physical core computing resource, that is, a service level of the level-1 resource pool is 100%. In a case in which a virtual machine includes only one VCPU, the number of physical cores in the level-1 resource pool is equal to the number of the virtual machines that run in the resource pool. The level-1 resource pool can ensure that one physical core computing resource is actually allocated to a virtual machine that always runs in the level-1 resource pool, but the "one physical core computing resource" may come from one or more physical cores in the resource pool. In another possible implementation manner, in addition to a level-1 resource pool, the advanced resource pool also includes a level-2 resource pool. A virtual machine that runs in the level-2 resource pool is allowed to occupy 50% of one physical core computing resource, that is, a service level of the level-2 resource pool is 50%. In other words, in the level-2 resource pool, 50% of one physical core computing resource is actually allocated to each virtual machine, but the "50% of one physical core computing resource" may come from one or more physical cores in the resource pool. In another possible implementation manner according to the embodiment of the present invention, the advanced resource pool may include only a level-2 resource pool. In another possible implementation manner according to the embodiment of the present invention, the advanced resource pool may further include a level-3 resource pool, where a virtual machine that runs in the level-3 resource pool is allowed to occupy 33% of one physical core computing resource. Persons skilled in the art can understand that, depending on a specific application requirement, more or fewer sub-resource pools may be set in the advanced resource pool, and service levels of the sub-resource pools may be different.

According to the embodiment of the present invention, step 110 may specifically include:

when the number of the virtual machines in the advanced resource pool increases, determining, according to the number of increased virtual machines and a service level of the advanced resource pool, a first number of physical cores that need to be allocated to the advanced resource pool; and allocating the first number of physical cores to the advanced resource pool from the default resource pool;

or when the number of the virtual machines in the advanced resource pool decreases, determining, according to the number of decreased virtual machines and a service level of the advanced resource pool, a second number of physical cores that need to be subtracted from the advanced resource pool; and allocating the second number of physical cores to the default resource pool from the advanced resource pool.

The physical cores in the advanced resource pool are allocated to the default resource pool when no virtual machine runs in the advanced resource pool. The following uses an example in which resource pools include a default resource pool and an advanced resource pool, and the advanced resource pool includes a level-1 resource pool and a level-2 resource pool for description. It should be noted that the example used here are merely intended to describe implementation manners of the embodiment of the present invention, instead of limiting the embodiment of the present invention. In description of the embodiment of the present invention, virtual machines that run in resource pools of different service levels may also be called virtual machines of corresponding service levels. For example, a virtual machine that runs in the level-1 resource pool may be called a level-1 virtual machine, and a virtual machine that runs in the default resource pool may be called a default virtual machine.

Initially, for example, after a system is powered on, all physical resources are allocated to the default resource pool because no virtual machine runs in the advanced resource pool. Depending on different application scenarios, virtual machines are started and added to different resource pools or virtual machines are migrated into different resource pools. A reverse process is to shut down the virtual machines or migrate the virtual machines out of the resource pools. For example, a level-1 virtual machine, that is, a virtual machine allowed to occupy 100% of one physical core computing resource is required. Then, a level-1 virtual machine needs to be created in the level-1 resource pool. Persons skilled in the art understand and know processes of creating and starting a virtual machine, and therefore, for brevity, the processes are not detailed herein. When level-1 virtual machines are added to the level-1 resource pool, a first number of physical cores that need to be allocated to the level-1 resource pool are determined according to the number of the added level-1 virtual machines, and then the first number of physical cores are allocated to the level-1 resource pool from the default resource pool. If the number of level-1 virtual machines needs to be decreased according to a specific application scenario, for example, if a second number of level-1 virtual machines need to be migrated out of the level-1 resource pool or a second number of level-1 virtual machines need to be shut down, by using an example in which the second number of level-1 virtual machines are migrated out of the level-1 resource pool, it is determined that the second number of physical cores need to be subtracted from the level-1 resource pool while the second number of level-1 virtual machines are migrated out of the level-1 resource pool. Subsequently, the second number of physical cores in the level-1 resource pool are allocated to the default resource pool. In this way, the number of allocated physical cores in the level-1 resource pool is adjusted dynamically according to the change in the number of virtual machines in the level-1 resource pool, and the number of allocated physical cores in the default resource pool is adjusted correspondingly.

For the level-2 resource pool, the adjusting manner is similar. A difference is that 50% of one physical core computing resource is actually allocated to a level-2 virtual machine in the level-2 resource pool.

According to the embodiment of the present invention, in a possible implementation manner, before step 110, the method further includes:

determining that, after the number of the virtual machines in the advanced resource pool changes, the number of the physical cores in the advanced resource pool is insufficient to satisfy a computing resource requirement of the advanced resource pool. For example, when one level-1 virtual machine is added to the level-1 resource pool of the advanced resource pool, the level-1 resource pool is unable to satisfy computing resource requirements of all the virtual machines in the level-1 resource pool because each virtual machine in the level-1 resource pool is allowed to exclusively occupy one physical core computing resource. The following case may also exist. For example, three level-2 virtual machines exist in the level-2 resource pool of the advanced resource pool, and each level-2 virtual machine is allowed to occupy 50% of one physical core computing resource. Therefore, two physical cores need to be allocated to the three level-2 virtual machines in the level-2 resource pool. However, after the physical core computing resources are actually allocated to the three level-2 virtual machines, 50% of one physical core computing resource is left. In this case, if one level-2 virtual machine is added to the level-2 resource pool, it will not occur that the level-2 resource pool is unable to satisfy the computing resource requirements of all the level-2 virtual machines. In this way, the remaining 50% of one physical core computing resource in the level-2 resource pool may be allocated to the newly added virtual machine. In this case, it is unnecessary to allocate a new physical core to the level-2 resource pool from the default resource pool.

According to the embodiment of the present invention, in a possible implementation manner, after step 110, the method further includes:

determining that, after the number of the virtual machines in the advanced resource pool changes, at least one idle physical core computing resource that does not serve a virtual machine in the advanced resource pool exists in the advanced resource pool, where the "at least one idle physical core computing resource" may come from different physical cores, that is, a sum of computing resources from different physical cores is equivalent to one physical core computing resource. For example, after one level-1 virtual machine is migrated out of the level-1 resource pool of the advanced resource pool, one idle physical core computing resource appears in the level-1 resource pool. In this case, one physical core may be allocated to the default resource pool from the level-1 resource pool for use by a virtual machine that runs in the default resource pool, so that computing resources of the physical core can be used efficiently.

For example, after one level-2 virtual machine is migrated out of the level-2 resource pool of the advanced resource pool, it is possible that no idle physical core computing resource appears because each virtual machine in the level-2 resource pool is allowed to occupy 50% of one physical core computing resource. Therefore, only when it is determined that at least one idle physical core computing resource exists in the level-2 resource pool can the physical core be allocated back to the default resource pool from the level-2 resource pool.

As mentioned above, default virtual machines in the default resource pool share computing resources of all the physical cores in the default resource pool. According to the embodiment of the present invention, a sharing manner may be determined according to a specific condition. In a first possible implementation manner, the default virtual machines may evenly share computing resources of all the physical cores in the default resource pool. According to an improved solution based on the first possible implementation manner, an upper-limit percentage of physical core computing resources that can be occupied by each default virtual machine in the default resource pool may be set. For example, the upper-limit percentage of the physical core computing resources that can be occupied by each virtual machine in the default resource pool are 10% of one physical core computing resource. In this way, a dominant virtual machine, that is, a virtual machine that occupies plenty of computing resources, is prevented from appearing in the default resource pool. According to another improved solution, to ensure computing performance of the virtual machines in the default resource pool, a lower-limit percentage of the physical core computing resources that can be occupied by each virtual machine may be set. For example, the lower-limit percentage of the physical core computing resources that can be occupied by each virtual machine in the default resource pool are 5% of one physical core computing resource. After the upper-limit percentage and the lower-limit percentage of a physical core computing resource that can be occupied by each virtual machine are determined, before step 110 is performed, the method 100 includes:

determining, according to the number of the virtual machines in the default resource pool and the lower-limit percentage of the physical core computing resources that can be occupied by a virtual machine in the default resource pool, that the default resource pool has sufficient resources to be allocated to the advanced resource pool; or, in a case in which a virtual machine is added to the default resource pool, determining that an upper limit of a capacity of the default resource pool has not been reached, that is, an additional virtual machine can still be accommodated.

For example, it is assumed that the lower-limit percentage of the physical core computing resources that can be occupied by each virtual machine in the default resource pool is 5%, and the upper-limit percentage of the physical core computing resources that can be occupied by each virtual machine in the default resource pool is 10%. In this case, it is assumed that the default resource pool includes 10 physical cores, and then, in the default resource pool, physical core computing resources can be provided for a maximum of 200 default virtual machines, and physical core computing resources can be provided for at least 100 default virtual machines. It is assumed that the number of the virtual machines that run in the default resource pool is 185. If one level-1 virtual machine needs to be added, that is, one physical core needs to be allocated to the level-1 resource pool of the advanced resource pool from the default resource pool, according to a computation result, after one physical core is allocated to the level-1 resource pool, the remaining physical core computing resources in the default resource pool can provide physical core computing resources for a maximum of 180 default virtual machines. However, 185 default virtual machines are running in the default resource pool currently. In this case, the method 100 includes: rejecting a request for adding an advanced virtual machine. In this example, the adding of a level-1 virtual machine is rejected. Certainly, in another case of the embodiment of the present invention, one physical core may be allocated to the level-1 resource pool of the advanced resource pool, and a lower limit of physical core computing resources occupied by each default virtual machine in the default resource pool is adjusted, or, according to a deployment policy of virtual machines in the default resource pool, a corresponding default virtual machine is shut down to satisfy the existing lower limit of the physical core computing resources occupied by each default virtual machine in the default resource pool.

For another example, it is assumed that the lower-limit percentage of one physical core computing resource that can be occupied by each virtual machine in the default resource pool is 5%, and the upper-limit percentage of one physical core computing resource that can be occupied by each virtual machine in the default resource pool is 10%. In this case, it is assumed that the default resource pool includes 10 physical cores, and the number of the virtual machines that run in the default resource pool is 185. If one virtual machine needs to be added to the default resource pool, that is, one default virtual machine needs to be added, according to a computation result, the default resource pool can accommodate three more default virtual machines, and therefore it is allowed to add one virtual machine to the default resource pool.

In another possible implementation manner, a priority may further be set for a default virtual machine in the default resource pool. The physical core computing resources in the default resource pool preferentially satisfy a requirement of a default virtual machine of a high priority. Because the upper-limit percentage and the upper limit of the physical core computing resources that can be occupied by each default virtual machine are set, the default virtual machine of a high priority will not become a "dominant virtual machine" that causes failure to allocate a computing resource be to a default virtual machine of a low priority.

Figure 2:
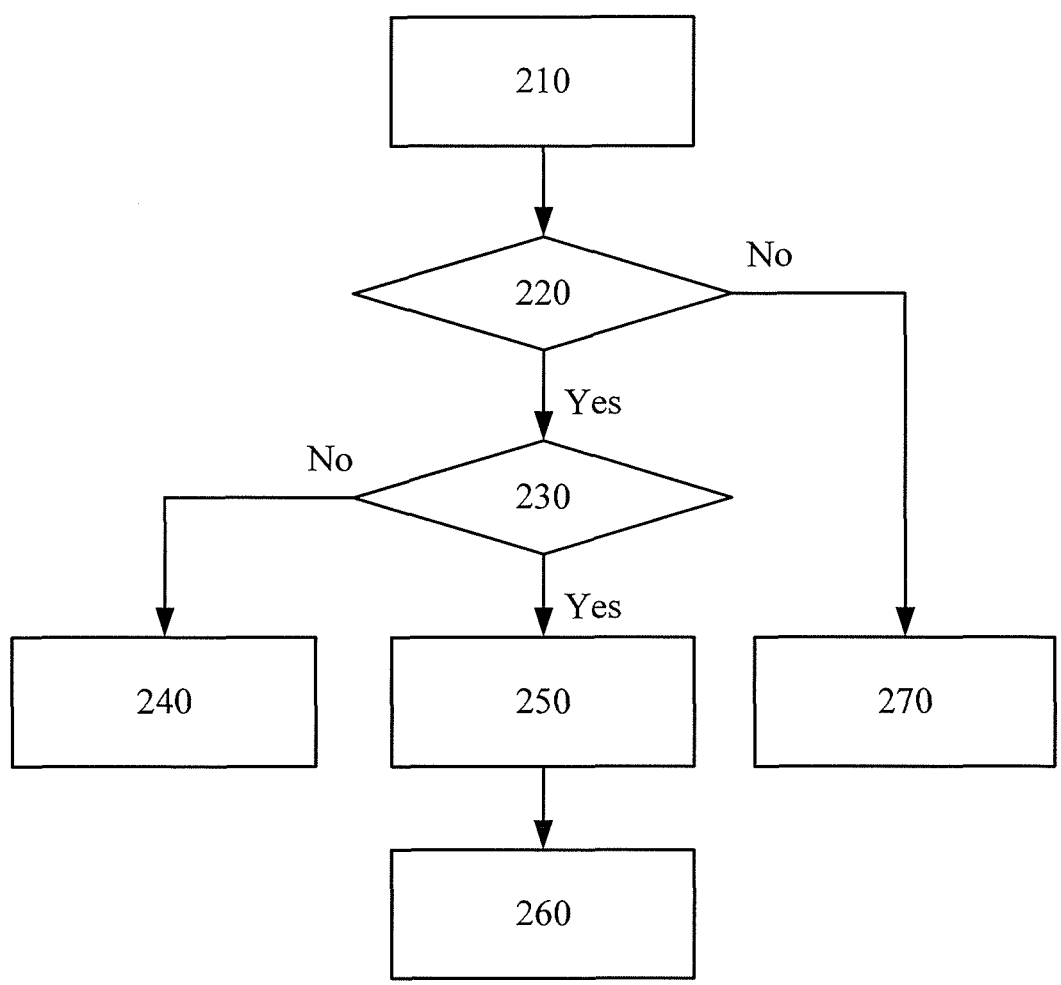
FIG. 2 is a flowchart of a specific example a process of migrating a virtual machine into a resource pool according to an embodiment of the present invention.

The following uses a specific procedure instance of adding a virtual machine to a level-2 resource pool to describe an implementation process of the embodiment of the present invention. FIG. 2 is a flowchart of a specific example of a virtual machine migration-in process according to an embodiment of the present invention. As shown in FIG. 2, a procedure 200 of adding a virtual machine to a level-2 resource pool includes the following steps:

210. A user requests migration of a virtual machine 1 into the level-2 resource pool.

220. A system determines whether physical core computing resources are sufficient.

That is, according to the number of virtual machines in a level-1 resource pool and the number of virtual machines in the level-2 resource pool, the number of virtual machines in a default resource pool, and a lower-limit percentage of computing resources allocated to each virtual machine in the default resource pool, the system determines whether there are sufficient computing resources to be allocated to the level-2 resource pool, where the level-1 resource pool and the level-2 resource pool are included in an advanced resource pool of an advanced resource pool currently. In this example, because a physical core may be migrated into the level-2 resource pool, the system needs to determine that at least one physical core in the default resource pool can be allocated to the level-2 resource pool. If physical core resources are sufficient, the procedure proceeds to step 230; and, if physical core resources are insufficient, the procedure skips to step 270.

230. If physical core computing resources are sufficient, the system determines whether a new physical core needs to be allocated to the level-2 resource pool after the virtual machine 1 is migrated into the level-2 resource pool.

Each virtual machine in the level-2 resource pool is allowed to occupy 50% of one physical core computing resource. Therefore, before the virtual machine 1 is migrated into the level-2 resource pool, if the number of the virtual machines in the level-2 resource pool is an odd number, 50% computing resource of one physical core remain unallocated in the level-2 resource pool. In this case, it is unnecessary to allocate a new physical core to the level-2 resource pool. On the contrary, before the virtual machine 1 is migrated into the level-2 resource pool, if the number of the virtual machines in the level-2 resource pool is an even number, a physical core needs to be allocated to the level-2 resource pool from the default resource pool so that the virtual machine 1 is provided with a computing resource.

240. If it is unnecessary to allocate a new physical core to the level-2 resource pool, migrate the virtual machine 1 into the level-2 resource pool, and allocate the remaining 50% of one physical core computing resource to the virtual machine 1.

250. If it is necessary to allocate a new physical core to the level-2 resource pool, allocate one physical core to the level-2 resource pool from the default resource pool, migrate the virtual machine 1 into the level-2 resource pool, and provide the virtual machine 1 with the remaining 50% of one physical core computing resource.

260. The default resource pool adjusts allocation of physical core computing resources among virtual machines in the default resource pool correspondingly.

According to the foregoing content, an adjustment manner of the physical core computing resources in the default resource pool varies with specific settings of the default resource pool. For example, if the virtual machines in the default resource pool evenly share computing resources of physical cores in the default resource pool, because a physical core is subtracted, computing resources of a physical core that are actually allocated to each virtual machine in the default resource pool are reduced correspondingly.

270. The virtual machine 1 is not allowed to migrate into the level-2 resource pool.

In this case, a notification may be sent to the user by using a message, indicating that the virtual machine 1 is not allowed to migrate into the level-2 resource pool because the physical core computing resources in the system are insufficient.

The procedure of migrating a virtual machine into the level-1 resource pool or the default resource pool is similar to the procedure shown in FIG. 2.

Figure 3:
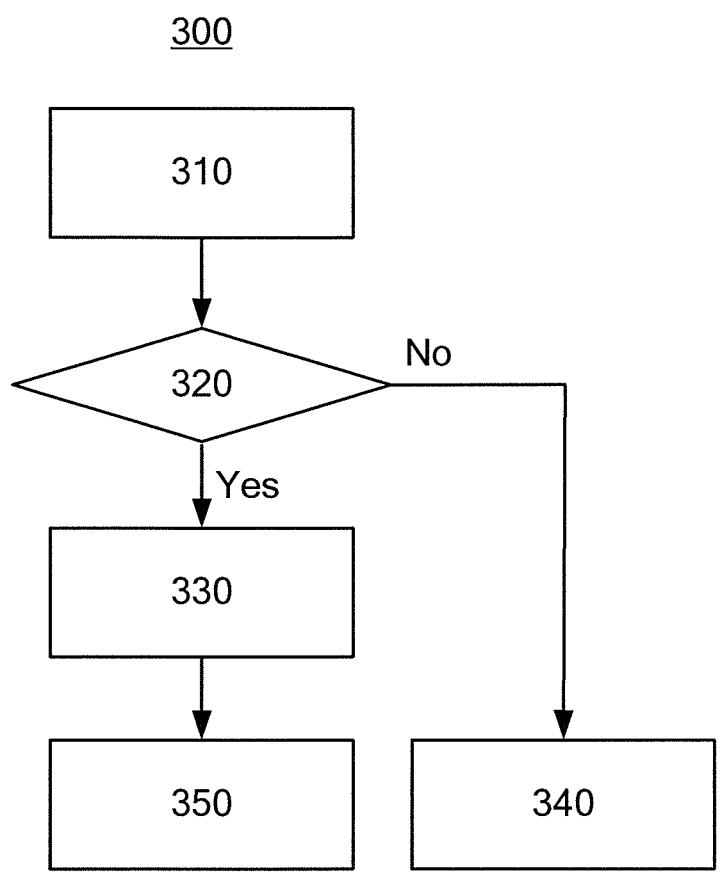
FIG. 3 is a flowchart of a specific example of a process of migrating a virtual machine out of a resource pool according to an embodiment of the present invention.

Corresponding to the procedure shown in FIG. 2, FIG. 3 is a procedure of migrating a virtual machine out of a level-2 resource pool. As shown in FIG. 3, a procedure 300 includes the following steps:

310. A user requests migration of a virtual machine 2 out of the level-2 resource pool.

320. A system determines whether the number of physical cores in the level-2 resource pool needs to be reduced after the virtual machine 2 is migrated out of the level-2 resource pool.

Each virtual machine in the level-2 resource pool is allowed to occupy 50% of one physical core computing resource. Therefore, before the virtual machine 2 is migrated out of the level-2 resource pool, if the number of virtual machines in the level-2 resource pool is an odd number, 50% of one physical core computing resource remains unallocated in the level-2 resource pool. In this case, after the virtual machine 2 is migrated out of the level-2 resource pool, one physical core computing resource is idle, and one physical core needs to be subtracted from the level-2 resource pool. On the contrary, before the virtual machine 2 is migrated out of the level-2 resource pool, if the number of the virtual machines in the level-2 resource pool is an even number, the number of the physical cores in the level-2 resource pool cannot be reduced.

330. If the number of the physical cores in the level-2 resource pool needs to be reduced, that is, when the number of the existing virtual machines in the level-2 resource pool is an odd number, 50% of one physical core computing resource remains unallocated in the level-2 resource pool. In this case, after the virtual machine 2 is migrated out of the level-2 resource pool, one physical core computing resource is idle, and one physical core is allocated to the default resource pool, and the procedure skips to step 350.

340. If the number of the physical cores in the level-2 resource pool does not need to be reduced, the virtual machine 2 is migrated out of the level-2 resource pool.

350. The default resource pool adjusts allocation of physical core computing resources among virtual machines in the default resource pool correspondingly.

In the embodiment of the present invention, if all the virtual machines in the level-2 resource pool are migrated out, all the physical cores in the level-2 resource pool are allocated to the default resource pool.

The foregoing embodiment uses an example in which an advanced resource pool includes a level-1 resource pool and a level-2 resource pool. Depending on an actual application scenario, the advanced resource pool may include no such sub-resource pools as the level-1 resource pool and the level-2 resource pool. Depending on an actual application scenario, the advanced resource pool may include not only the level-1 resource pool and the level-2 resource pool, and a service level of each sub-resource pool may be set according to the actual application.

According to the foregoing content, adjustment of the physical core computing resources in the default resource pool varies with specific settings of the default resource pool. For example, if the virtual machines in the default resource pool evenly share the computing resources of physical cores in the default resource pool, because one physical core is added, a physical core computing resource that is allocated to each virtual machine in the default resource pool is increased correspondingly, to fully use the physical core computing resources.

Figure 4:
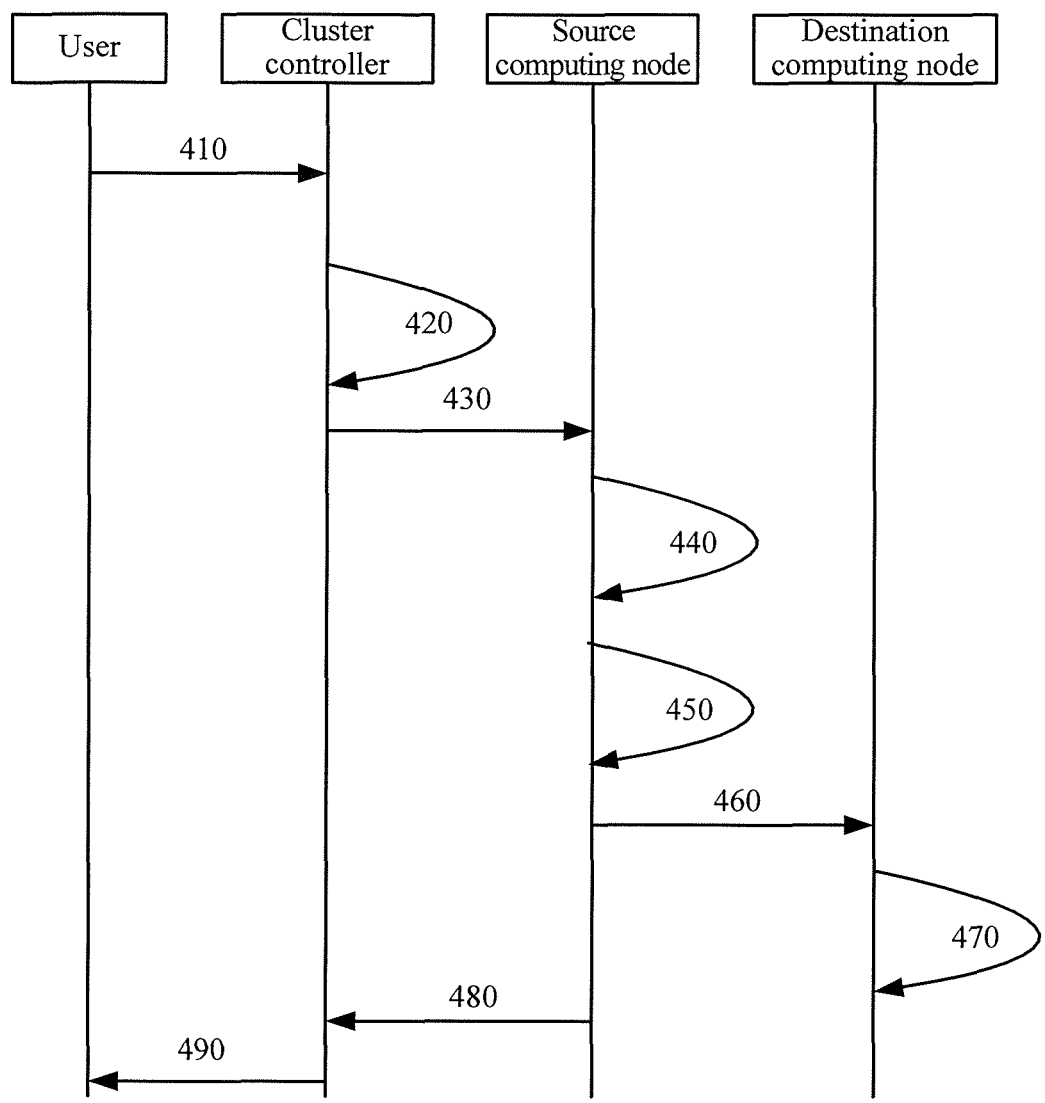
FIG. 4 is signaling interworking diagram for migrating a virtual machine from a source computing node to a destination computing node.

FIG. 4 is a signaling interworking diagram of a specific application scenario according to an embodiment of the present invention. As described in the application scenario shown in FIG. 4, a virtual machine is migrated from a source computing node to a destination computing node. The method in the embodiment of the present invention, which is shown in FIG. 1, FIG. 2, and FIG. 3, may be applicable to the application scenario shown in FIG. 4.

As shown in FIG. 4, a migration process 400 includes the following steps:

410. A user sends a virtual machine migration request to a cluster controller, requesting migration of a virtual machine 3 from the source computing node to the destination computing node.

420. The cluster controller receives the virtual machine migration request sent by the user, and performs corresponding processing.

The cluster controller may perform corresponding processing according to a conventional virtual machine scheduling procedure, for example, preoccupying allocated resources.

430. The cluster controller sends a scheduling request to the source computing node, to migrate the virtual machine 3 out of the source computing node.

440. The virtual machine 3 is migrated out of the source computing node.

On the source computing node, for example, a virtual machine migration-out procedure shown in FIG. 3 is performed.

450. The source computing node implements dynamic adjustment of physical core computing resources.

460. The virtual machine 3 is migrated into the destination computing node.

On the destination computing node, for example, a virtual machine migration-in procedure shown in FIG. 2 is performed.

470. The destination computing node implements dynamic adjustment of physical core computing resources.

480. The source computing node returns a migration-out success or failure message to the cluster controller.

490. The cluster controller notifies the user of a result of migration of the virtual machine 3 from the source computing node to the destination computing node.

According to the embodiment of the present invention, physical cores are divided into different resource pools, and computing resources of physical cores in one resource pool are isolated from those in another resource pool, thereby implementing effective allocation of physical core computing resources for different application scenarios, avoiding appearance of a dominant virtual machine that occupies plenty of computing resources, preventing imbalanced allocation of physical core computing resources, and improving efficiency of using computing resources of the physical cores.

The method in the embodiment of the present invention is applicable to different cloud computing business models. For example, in an Internet data center (Internet Data Center, IDC for short) business model, a virtual machine located in a level-1 resource pool may be provided for a user, so that the virtual machine exclusively occupies one physical core computing resource at all time, and the computing resource will not be occupied by another user, thereby providing a stable computing capability for the user. For example, in a service private cloud (Service Private Cloud, SPC for short) business model, a virtual machine provided for a user is required to have not only high performance and service stability and but also a certain extent of CPU resource reuse. Therefore, virtual machines in both the level-1 resource pool and a level-2 resource pool satisfy an application in such a scenario. For another example, in a virtual desktop infrastructure (Virtual Desktop Infrastructure, VDI for short) business model, a user requires a high price/performance ratio of a virtual machine and reusability of resources. In this case, the virtual machine has a high busy-to-idle ratio, and virtual machines in a default resource pool are suitable for the scenario.

Figure 5:
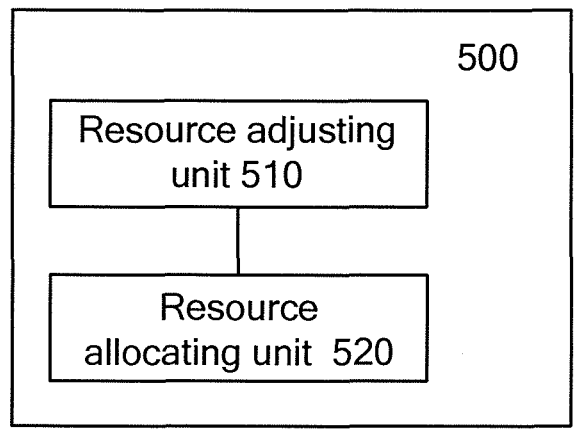
FIG. 5 is a schematic structural diagram of a computing node according to an embodiment of the present invention.

An embodiment of the present invention further proposes a computing node that can apply the method in the embodiment of the present invention. As shown in FIG. 5, a computing node 500 includes:

a resource adjusting unit 510, configured to adjust dynamically, according to a change in the number of virtual machines in an advanced resource pool, the number of allocated physical cores in the advanced resource pool, and adjust, according to the number of allocated physical cores in the advanced resource pool, the number of allocated physical cores in a default resource pool; and a resource allocating unit 520, configured to divide physical cores of a central processing unit into the default resource pool and the advanced resource pool according to service levels of the resource pools.

In this embodiment of the present invention, each resource pool serves virtual machines that run in the resource pool. In a proper case, the computing node according to this embodiment of the present invention may have other technical features in the method embodiment of the present invention. The following uses examples to describe this.

According to the embodiment of the present invention, the service level includes the number of physical core computing resources that can be occupied by each virtual machine.

According to the embodiment of the present invention, the resource allocating unit 520 is configured to schedule virtual machines in the default resource pool to share computing resources of all the physical cores in the default resource pool.

According to the embodiment of the present invention, the advanced resource pool includes a level-1 resource pool, where each virtual machine in the level-1 resource pool is allowed to exclusively occupy one physical core computing resource.

According to the embodiment of the present invention, the advanced resource pool includes a level-2 resource pool, where each virtual machine in the level-2 resource pool is allowed to occupy 50% of one physical core computing resource.

According to the embodiment of the present invention, when the number of the virtual machines in the advanced resource pool increases, the resource adjusting unit 510 determines, according to the number of increased virtual machines and a service level of the advanced resource pool, a first number of physical cores that need to be allocated to the advanced resource pool, and allocates the first number of physical cores to the advanced resource pool from the default resource pool;

or when the number of the virtual machines in the advanced resource pool decreases, the resource adjusting unit 510 determines, according to the number of decreased virtual machines and a service level of the advanced resource pool, a second number of physical cores that need to be subtracted from the advanced resource pool, and allocates the second number of physical cores to the default resource pool from the advanced resource pool.

According to the embodiment of the present invention, the resource adjusting unit 520 is configured to allocate the physical cores in the advanced resource pool to the default resource pool when no virtual machine runs in the advanced resource pool.

Figure 6:
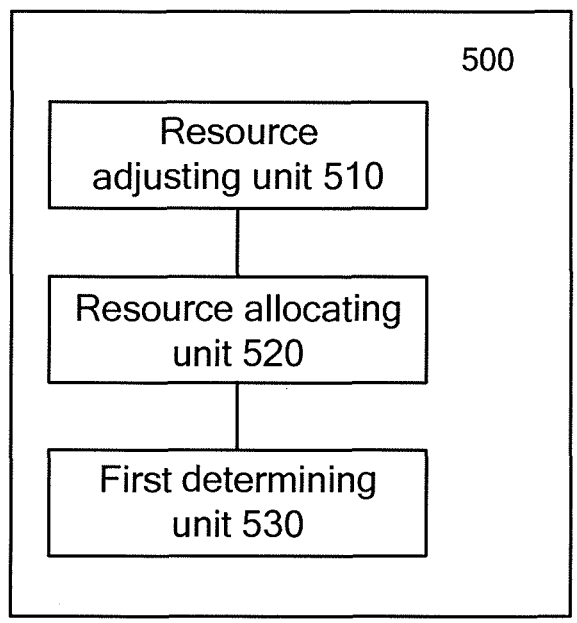
FIG. 6 is a schematic structural diagram of a computing node according to an embodiment of the present invention.

As shown in FIG. 6, according to the embodiment of the present invention, the computing node 500 further includes:

a first determining unit 530, configured to determine that, after the number of the virtual machines in the advanced resource pool changes, the number of the physical cores in the advanced resource pool is insufficient to satisfy the service level of the advanced resource pool.

According to the embodiment of the present invention, the first determining unit 530 is further configured to determine that, when the number of the virtual machines in the advanced resource pool changes, at least one idle physical core computing resource that does not serve a virtual machine in the advanced resource pool exists in the advanced resource pool.

According to the embodiment of the present invention, the resource allocating unit 520 is configured to schedule the virtual machines in the default resource pool to share computing resources of all the physical cores in the default resource pool according to a preset percentage of the physical core computing resources that can be occupied by each virtual machine.

According to the embodiment of the present invention, the resource adjusting unit 510 is configured to determine, according to the number of the physical cores in the default resource pool and the preset percentage of the physical core computing resources that can be occupied by each virtual machine, the number of virtual machines that can be accommodated by the default resource pool.

According to the embodiment of the present invention, the resource allocating unit 520 is configured to schedule the virtual machines in the default resource pool to evenly share computing resources of all the physical cores in the default resource pool.

According to the embodiment of the present invention, the resource allocating unit 520 is configured to set, for each virtual machine in the default resource pool, an upper-limit percentage and/or a lower-limit percentage of the physical core computing resources that can be occupied by each virtual machine.

According to the embodiment of the present invention, the resource allocating unit 520 is configured to set, for the virtual machines in the default resource pool, a priority of each virtual machine in using physical core computing resources, and allocate physical core computing resources to the virtual machines in the default resource pool in descending order of priorities.

Figure 7:
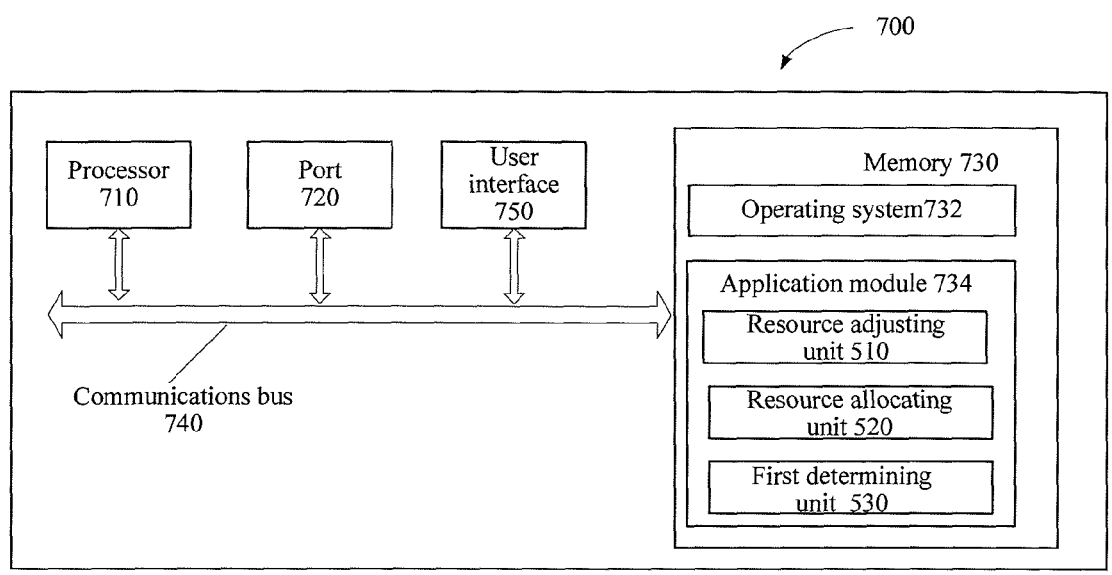
FIG. 7 is another schematic structural diagram of a computing node according to an embodiment of the present invention.

FIG. 7 is another schematic structural diagram of a computing node according to an embodiment of the present invention. As shown in FIG. 7, a computing node 700 includes at least one processor 710 such as a CPU, at least one port 720, a memory 730, and at least one communications bus 740. The communications bus 740 is configured to implement connections and communication between these apparatuses. The processor 710 is configured to execute an executable module stored in the memory 730, such as a computer program. Optionally, the computing node includes a user interface 750, which includes but is not limited to a display, a keyboard, and a click device such as a mouse, a trackball (trackball), a touchpad, or a touchscreen. The memory 730 may include a high-speed RAM memory, and may include a non-volatile memory (non-volatile memory), such as at least one magnetic disk memory. Communication connection between the computing node and the cluster controller is implemented by using the at least one port 720, and communication connection between the computing node and at least one other computing node is implemented by using the at least one other port 720.

In some implementation manners, the memory 730 stores the following element, an executable module or a data structure, or a subset thereof, or an extension set thereof:

an operating system 732, including various system programs, which is configured to implement various basic services and process hardware-based tasks; and an application module 734, including various applications, which is configured to implement various application services.

The application module 734 includes but is not limited to a resource adjusting unit 510, a resource allocating unit 520, and a first determining unit 530.

For specific implementation of the units in the application module 734 reference may be made to corresponding units in the embodiments shown in FIG. 5 and FIG. 6, and details are not described herein again.

A person of ordinary skill in the art can be aware that the exemplary units and algorithm steps described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that such implementation goes beyond the scope of the present invention.

It can be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the division of units is merely a division of logical functions and there may be other divisions in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may be or not be physically separate, and parts displayed as units may be or not be physical units, that is, the units may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for allocating central processing unit resources of a computing node, wherein physical cores of the computing node are pooled into an advanced resource pool and a default resource pool, wherein the method is performed by the computing node, the method comprising:
   determining, according to a change in a number of virtual machines that run in the advanced resource pool, a number of physical cores that need to be adjusted between the advanced resource pool and the default resource pool, wherein a virtual machine running in the advance resource pool is allowed to occupy more physical core computing resources than a virtual machine running in the default resource pool; and
   adjusting, according to the number of physical cores that need to be adjusted, a number of physical cores for the virtual machines that run in a default resource pool;
   determining that the change in the number of the virtual machines in the advanced resource pool is an increase and based thereon:
      determining, according to the increase, a first number of physical cores that need to be allocated to the advanced resource pool; and
      wherein adjusting, according to the number of the physical cores that need to be adjusted, the number of physical cores for the virtual machines that run in the default resource pool, comprises allocating the first number of physical cores to the advanced resource pool from the default resource pool;
   determining that after the first number of the physical cores is allocated to the advanced resource pool from the default resource pool, a lower-limit percentage of the physical core computing resources that can be occupied by each virtual machine in the default resource pool cannot be met and, based thereon, adjusting, a lower limit of physical core computing resources occupied by each default virtual machine in the default resource pool.

2. The method according to claim 1, wherein before allocating the first number of physical cores to the advanced resource pool from the default resource pool, the method further comprises determining that, after the number of the virtual machines in the advanced resource pool changes, the number of the physical cores in the advanced resource pool is insufficient to satisfy the requirements of the virtual machines that run in the advanced resource pool.

3. The method according to claim 1, wherein:
   when the number of the virtual machines in the advanced resource pool decreases, determining, according to the number of decreased virtual machines, a second number of physical cores that need to be subtracted from the advanced resource pool; and
   adjusting, according to the number of the physical cores need to be adjusted, the number of physical cores for the virtual machines that run in the default resource pool, comprises:
      allocating the second number of physical cores to the default resource pool from the advanced resource pool.

4. The method according to claim 3, wherein before allocating the second number of physical cores to the default resource pool from the advanced resource pool, the method further comprises:
   determining that, after the number of the virtual machines in the advanced resource pool changes, at least one idle physical core computing resource that does not serve a virtual machine in the advanced resource pool exists in the advanced resource pool.

5. The method according to claim 1, wherein the advanced resource pool comprises a level-1 resource pool and each virtual machine in the level-1 resource pool is allowed to exclusively occupy one physical core computing resource.

6. The method according to claim 5, wherein the advanced resource pool comprises a level-2 resource pool and each virtual machine in the level-2 resource pool is allowed to occupy 50% of one physical core computing resource.

7. The method according to claim 1, further comprising:
   setting, for virtual machines that run in the default resource pool, an upper-limit percentage of the physical core computing resources that can be occupied by each virtual machine.

8. The method according to claim 1, further comprising:
   setting, for virtual machines that run in the default resource pool, the lower-limit percentage of the physical core computing resources that can be occupied by each virtual machine.

9. A computing node for allocating central processing unit resources to a virtual machine, wherein physical cores of the computing node are pooled into an advanced resource pool and a default resource pool, the computing node comprising:
   a memory comprising instructions; and
   one or more processors in communication with the memory and configured to execute the instructions to:
   determine, according to a change in the number of virtual machines that run in the advanced resource pool, a number of physical cores need to be adjusted between the advanced resource pool and the default resource pool, wherein a virtual machine running in the advance resource pool is allowed to occupy more physical core computing resources than a virtual machines running in the default resource pool; and
   adjust, according to the number of physical cores that need to be adjusted, a number of physical cores for the virtual machines that run in a default resource pool;
   determine that the change in the number of the virtual machines in the advanced resource pool is an increase and based thereon:
   determine, according to the increase, a first number of physical cores that need to be allocated to the advanced resource pool; and
   allocate the first number of physical cores to the advanced resource pool from the default resource pool;
   determine that after the first number of the physical cores is allocated to the advanced resource pool from the default resource pool, a lower-limit percentage of the physical core computing resources that can be occupied by each virtual machine in the default resource pool cannot be met and, based thereon, adjust, a lower limit of physical core computing resources occupied by each default virtual machine in the default resource pool.

10. The computing node according to claim 9, wherein the one or more processors execute the instructions to:
   determine that, after the number of the virtual machines in the advanced resource pool changes, the number of the physical cores in the advanced resource pool is insufficient to satisfy the requirements of the virtual machines that run in the advanced resource pool.

11. The computing node according to claim 9, wherein the one or more processors execute the instructions to:
   when the number of the virtual machines in the advanced resource pool decreases, determine, according to the number of decreased virtual machines, a second number of physical cores that need to be subtracted from the advanced resource pool; and
   allocate the second number of physical cores to the default resource pool from the advanced resource pool.

12. The computing node according to claim 11, wherein the one or more processors execute the instructions to:
   determine that, after the number of the virtual machines in the advanced resource pool changes, at least one idle physical core computing resource that does not serve a virtual machine in the advanced resource pool exists in the advanced resource pool.

13. The computing node according to claim 9, wherein the advanced resource pool comprises a level-1 resource pool and each virtual machine in the level-1 resource pool is allowed to exclusively occupy one physical core computing resource.

14. The computing node according to claim 13, wherein the advanced resource pool comprises a level-2 resource pool and each virtual machine in the level-2 resource pool is allowed to occupy 50% of one physical core computing resource.

15. The computing node according to claim 9, wherein the one or more processors execute the instructions to:
   set, for virtual machines that runs in the default resource pool, an upper-limit percentage of the physical core computing resources that can be occupied by each virtual machine.

16. The computing node according to claim 9, wherein the one or more processors execute the instructions to:
   set, for virtual machines that run in the default resource pool, the lower-limit percentage of the physical core computing resources that can be occupied by each virtual machine.

* * * * *